United States Patent [19]
Ishiguro

[11] Patent Number: 5,483,284
[45] Date of Patent: Jan. 9, 1996

[54] ELECTRONIC STILL PHOTOGRAPHIC ADAPTOR MOUNTABLE SINGLE-LENS REFLEX CAMERA

[75] Inventor: Yasuaki Ishiguro, Fujimi, Japan

[73] Assignee: Nikon Corporation, Tokyo, Japan

[21] Appl. No.: 183,243

[22] Filed: Jan. 19, 1994

Related U.S. Application Data

[63] Continuation of Ser. No. 845,265, Mar. 3, 1992, abandoned.

[30] Foreign Application Priority Data

Mar. 4, 1991 [JP] Japan .................................. 3-037453

[51] Int. Cl.$^6$ .................................................. H04N 5/225
[52] U.S. Cl. ......................... 348/335; 348/340; 348/207
[58] Field of Search .................................... 348/207, 220, 348/221, 231, 335, 340, 343; 354/412, 75; 359/565, 569, 891, 892; H04N 5/225

[56] References Cited

U.S. PATENT DOCUMENTS

| | | | |
|---|---|---|---|
| 4,611,243 | 9/1986 | Morisawa et al. | 348/374 |
| 4,757,387 | 7/1988 | Saito | 358/225 |
| 4,814,811 | 3/1989 | Saito et al. | 354/412 |
| 4,823,199 | 4/1989 | Sakakibara et al. | 348/335 |
| 4,855,837 | 8/1989 | Tanimoto | 358/229 |
| 5,122,880 | 6/1992 | Nagano | 358/209 |
| 5,294,990 | 3/1994 | Aoki | 348/363 |

FOREIGN PATENT DOCUMENTS

| | | | |
|---|---|---|---|
| 1-321782 | 12/1989 | Japan | H04N 5/225 |
| 2-101874 | 4/1990 | Japan | H04N 5/225 |
| 2-101447 | 4/1990 | Japan | H04N 5/225 |

*Primary Examiner*—Joseph Mancuso
*Assistant Examiner*—Tuan V. Ho
*Attorney, Agent, or Firm*—Shapiro and Shapiro

[57] ABSTRACT

A single-lens reflex camera has a mirror movable between a non-photographic position where light from a subject is transmitted to a finder optical system and a photographic position where the light is transmitted to a film plane, a focal-plane shutter normally closed to prevent the light from reaching the film plane and moved to open so as to allow the light to reach the film plane, and a removable, ordinary photograph back panel. The camera is also provided for electronic still photography with an electronic still photographic adaptor substituted for the back panel and having an image pick-up device located near the film plane when set thereon, and with an optical low-pass filter located between the focal-plane shutter and the mirror to cut off high space frequency components of light. The camera further has a first detection device for detecting mounting of the electronic still photographic adaptor, a second detection device for detecting mounting of the optical low-pass filter, and a control means for inhibiting the opening operation of the focal plane shutter when either one of the first and second detection devices detects no mounting, but for allowing the opening operation of the shutter when both detection devices detect the respective mountings.

13 Claims, 9 Drawing Sheets

ELECTRONIC STILL PHOTOGRAPHIC ADAPTOR MOUNTABLE SINGLE-LENS REFLEX CAMERA

This is a continuation of application Ser. No. 845,265 filed Mar. 3, 1992, now abandoned.

BACKGROUND OF THE INVENTION

1. Field of the Invention

The present invention relates to a single-lens reflex camera, to which an adaptor for electronic still photography may be mounted.

2. Related Background Art

In conventional single-lens reflex cameras, an adaptor for electronic still photography is mounted onto a camera main body after removal of a back panel, which is replaceably mounted on the camera body, to record electronic information on a record medium, instead of to record an image of a subject on a film. Such an adaptor is provided with a CCD (charge coupled device) storage image pick-up element, an optical system to lead the image of the subject to the CCD, and with an optical low-pass filter located before the CCD to cut off high frequency components in space frequencies of the image.

In the conventional units as described, there remains a problem of increase in dimensions of the camera itself because the adaptor is provided with all the image pick-up element, the optical system and the optical low-pass filter.

SUMMARY OF THE INVENTION

It is, therefore, an object of the present invention to provide a single-lens reflex camera together with an adaptor for electronic still photography, compact in shape and easy in handling.

DETAILED DESCRIPTION OF THE PREFERRED EMBODIMENTS

FIGS. 1–11 are drawings to illustrate preferred embodiments of a single-lens reflex camera, to which an adaptor for electronic photography may be mounted, according to the present invention.

Figure 1:
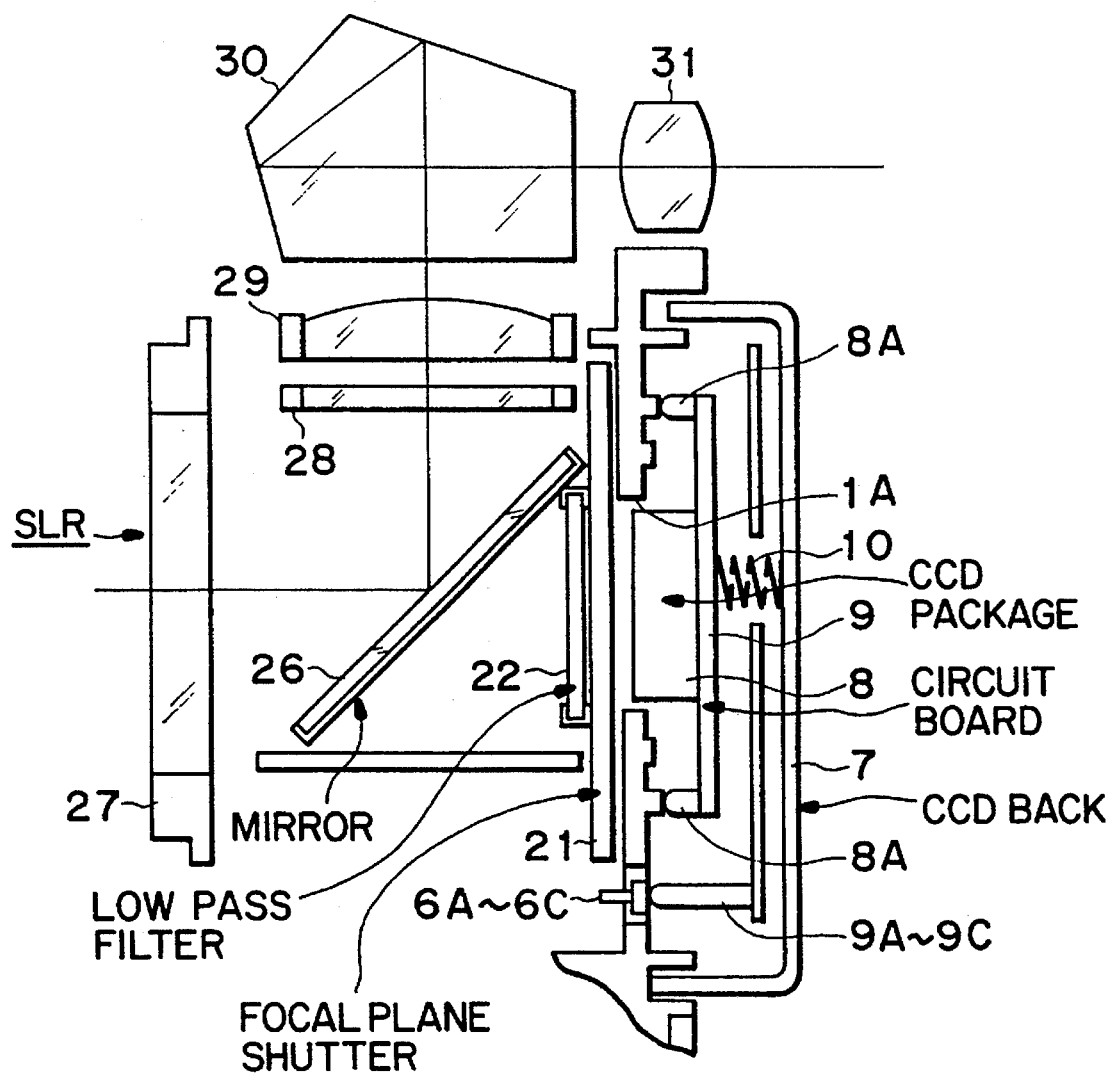
FIG. 1 is a sectional view of a camera with a CCD-back according to the present invention.

FIG. 1 is a sectional view of a single-lens reflex camera along its optical axis. In FIG. 1, the single-lens reflex camera has a movable mirror 26 located in an optical path of luminous flux through a photographic lens not shown to lead the luminous flux to a finder optical system 28–31, but, upon photographing, retracted from the optical path of luminous flux to lead the luminous flux towards a film plane. The camera also has a focal-plane shutter 21, and an electronic still photographic adaptor or CCD-back 7 replaceable for an ordinary back panel of the camera. The CCD-back 7 is provided with a CCD package 8 located near the film-plane when mounted to generate an image signal of image upon reception of luminous flux through the photographic lens. Further, the camera has an optical low-pass filter 22, which is removably disposed between the focal-plane shutter 21 and the movable mirror 26 to cut off high frequency components in space frequencies of luminous flux. The single-lens reflex camera is explained below in more detail.

STRUCTURE

Figure 2A:
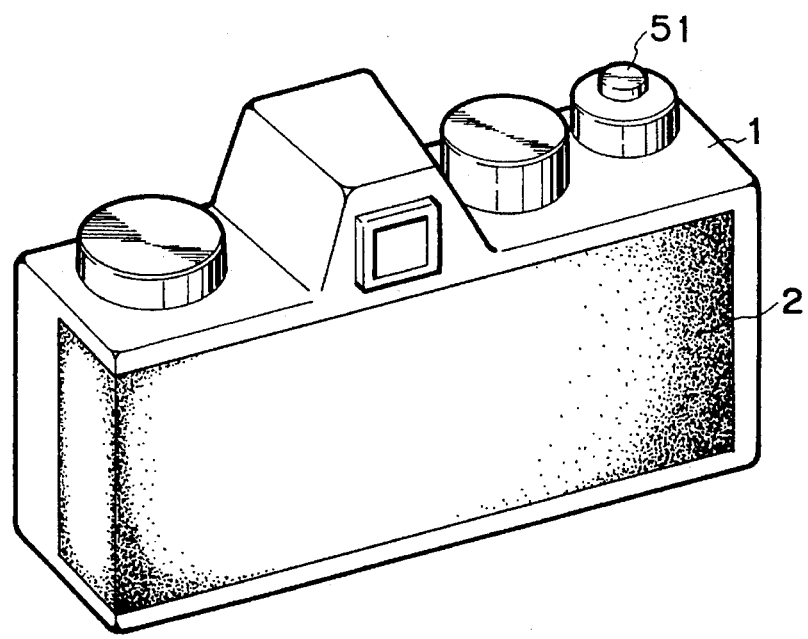
FIG. 2A is a perspective view of a camera with a film-back according to the present invention.
Figure 2B:
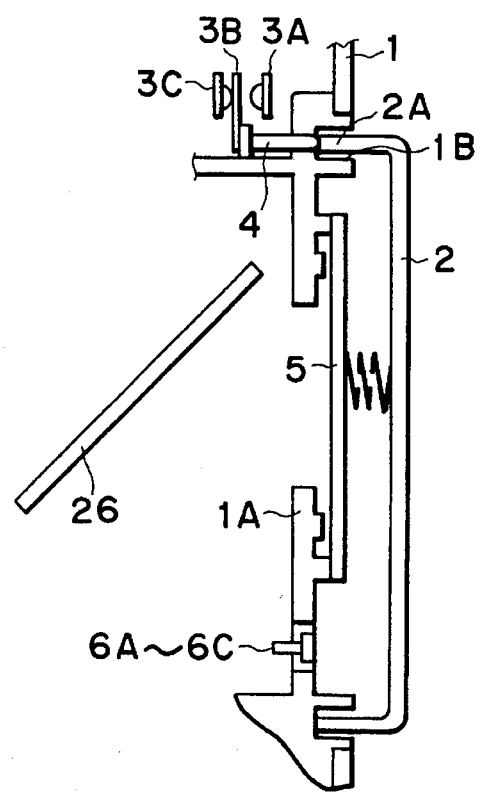
FIG. 2B is a sectional view of the camera with the film-back as shown in FIG. 2A.
Figure 3A:
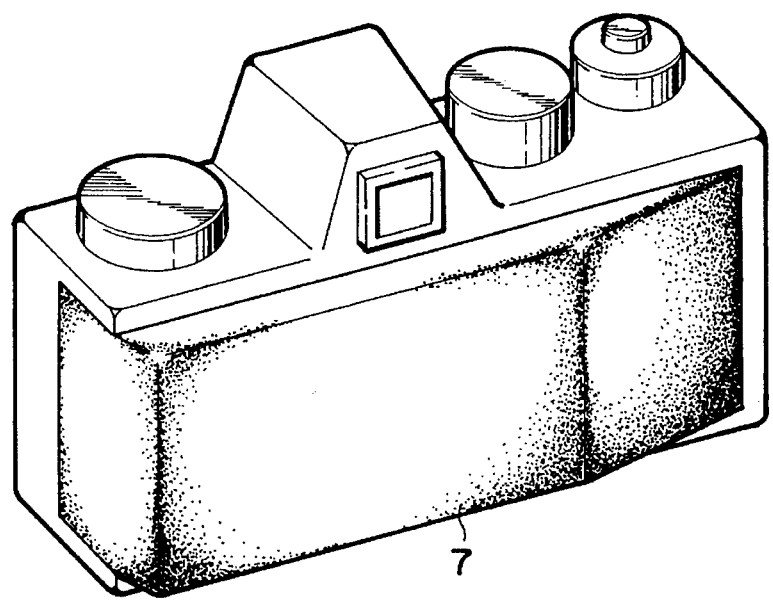
FIG. 3A is a perspective view of a camera with a CCD-back according to the present invention.
Figure 3B:
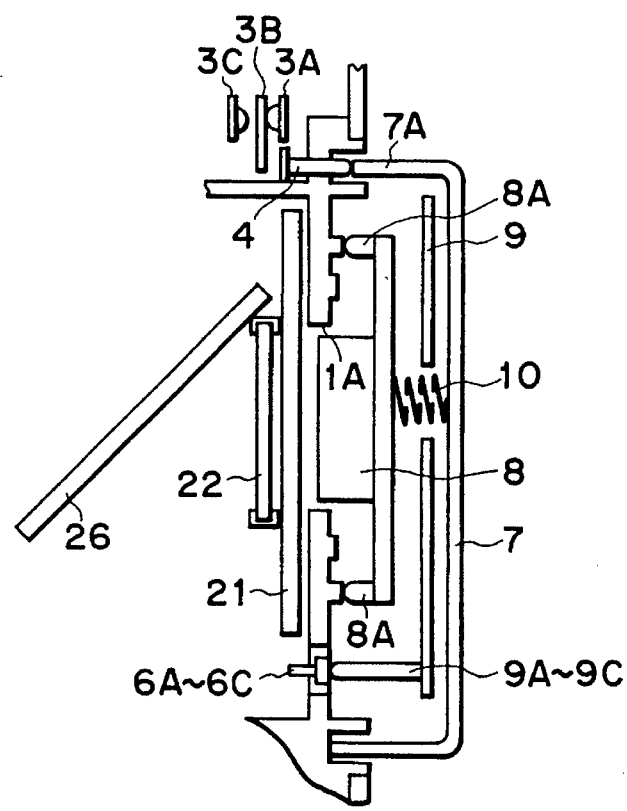
FIG. 3B is a sectional view of the camera with the CCD-back as shown in FIG. 3A.

FIGS. 2A and 3A are perspective views of the single-lens reflex camera, and FIGS. 2B and 3B vertical cross sections of the camera.

A film-back 2 is attached to a camera main body 1 as shown in FIG. 2A to support a silver salt film loaded in the camera. In FIG. 3A, the camera main body 1 as shown in FIG. 2A carries the CCD-back 7 having a device for electronically detecting and recording an image of a subject, instead of the film-back 2.

In FIG. 2B, the camera main body 1 is provided with detection switch contacts 3A, 3B, 3C for detecting if either the film-back 2 or the CCD-back 7 is mounted. These switch contacts 3A, 3B, 3C are disposed in the back of a groove 1B on the camera main body 1, into which a periphery of the film-back 2 or the CCD-back 7 is fit. These switch contacts 3A, 3B, 3C are switched by a combination of a switching member 4 and a protruding portion 2A. The switching member 4 is disposed to slide in a through opening perforated through the groove 1B of the camera body 1. The protruding portion 2A is disposed at a periphery of the film-back 2. When the film-back 2 is mounted on the camera body 1, the protruding portion 2A of the film-back 2 pushes the switching member 4 to bring the detection switch contacts 3B, 3C into contact with each other. The film-back 2 has a press plate 5 to urge the film against a guide rail of the camera body 1.

As seen in FIG. 3B, when the CCD-back 7 is mounted onto the camera body 1, the protruding portion 7A of the CCD-back pushes the switching member 4 to bring the detection switch contacts 3A, 3B into contact with each other. The CCD-back 7 carries through a spring 10 the CCD package 8, in which a charge storage image pick-up device or area CCD image sensor of plural elements is included. The CCD package possesses four positioning pins 8A at four corners thereof. When the CCD package 8 is mounted onto the camera body 1, the pins 8A contact with a guide rail plane of an aperture 1A while being urged by the spring 10, so that the CCD package is restricted to move in a direction of the optical axis. By this arrangement, the CCD package 8 may be precisely located at a position of the focal surface of the subject luminous flux through the photographic lens. An image signal is transmitted from the CCD package 8 to a central processing unit (CPU) on an electronic circuit board 9. Various signals are transferred between the electronic circuit board 9 and a CPU in the camera body 1 through terminals 9A–9C and terminals 6A–6C. There is an image recording device (not shown), for example an electronic recording device such as IC card, floppy disk, or the like, built in the CCD-back 7 to record the image signal from the CCD package 8.

Various CCD-backs 7 mountable onto the camera body 1 as shown in FIG. 3A may be provided, corresponding to various image sizes of image. Therefore, there is a function provided to transmit to the camera body 1 information about a photo-acceptance photographic area or image plane size of the CCD in the CCD package 8 on the CCD back 7, different in CCD size from others.

A circuit structure of the single-lens reflex camera is explained below with reference to FIGS. 4 and 5. FIG. 5 shows a modification of the camera as shown in FIG. 4.

Figure 4:
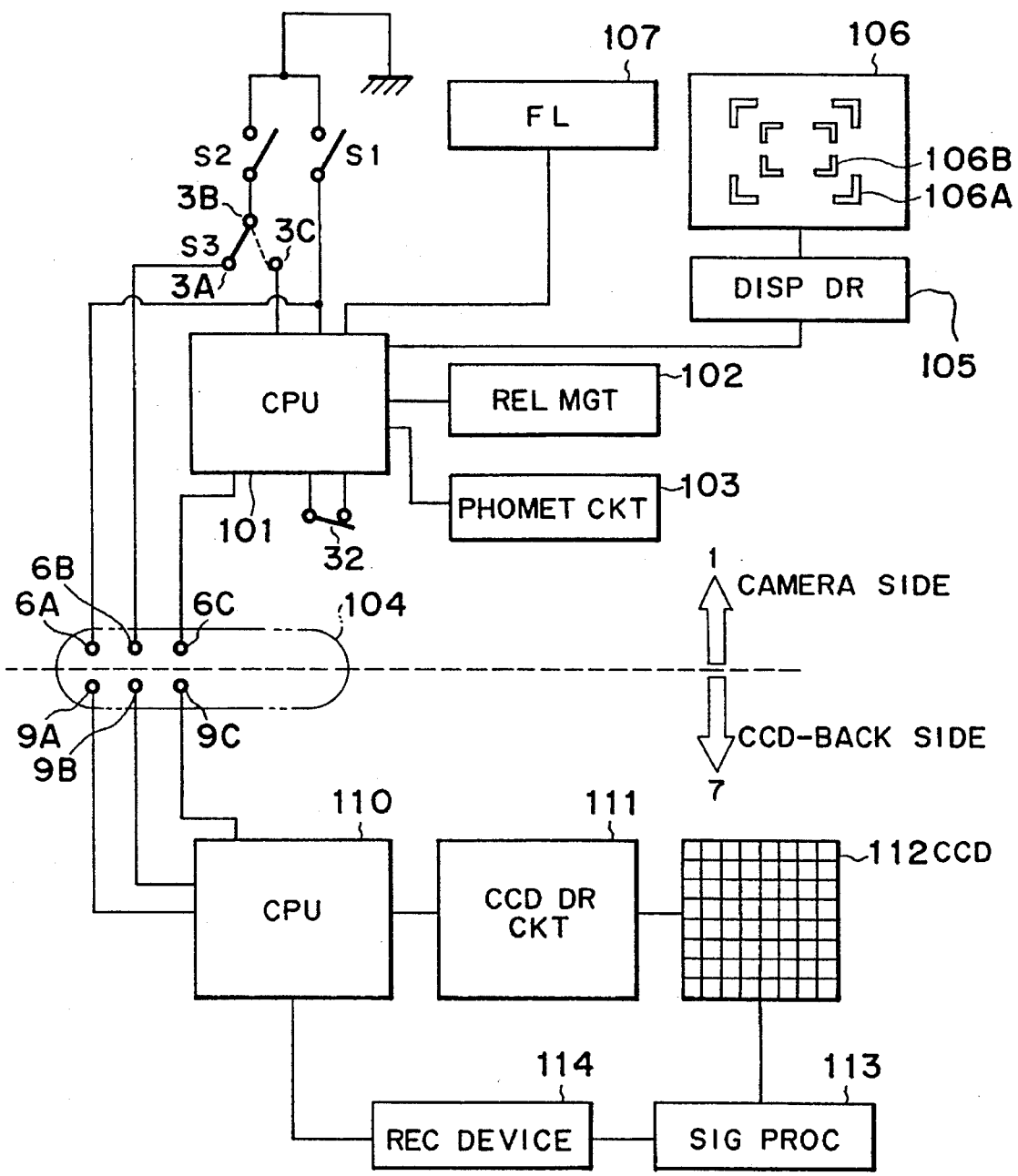
FIG. 4 is a block diagram of a circuit of the camera with the CCD-back.
Figure 5:
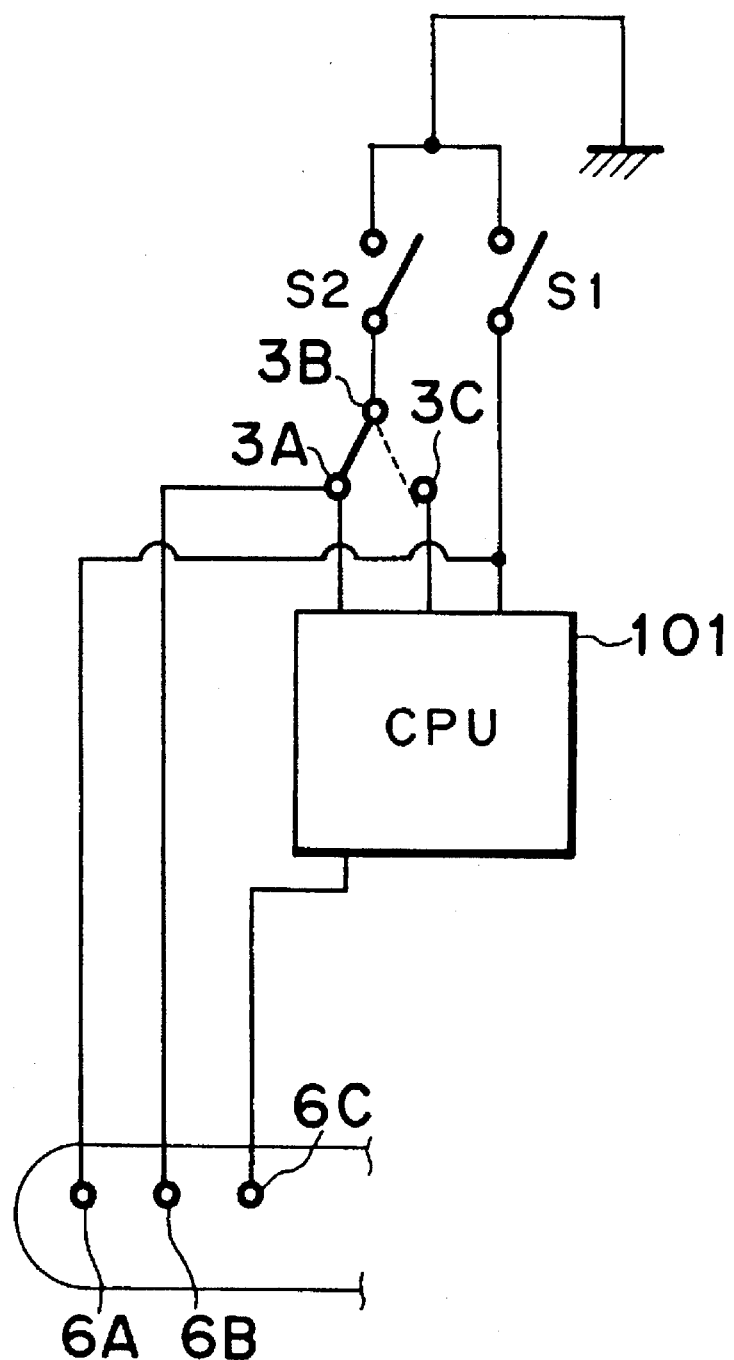
FIG. 5 is a block diagram of a circuit to show a modification of the camera with the CCD-back as shown in FIG. 4.

FIG. 4 is a block diagram of a circuit in the CCD-back 7 and camera body 1. The camera body 1 and the CCD-back 7 are electrically connected by a connector 104 so that signals may be transferred through the terminals 9A–9C and the terminals 6A–6C therebetween.

Figure 6:
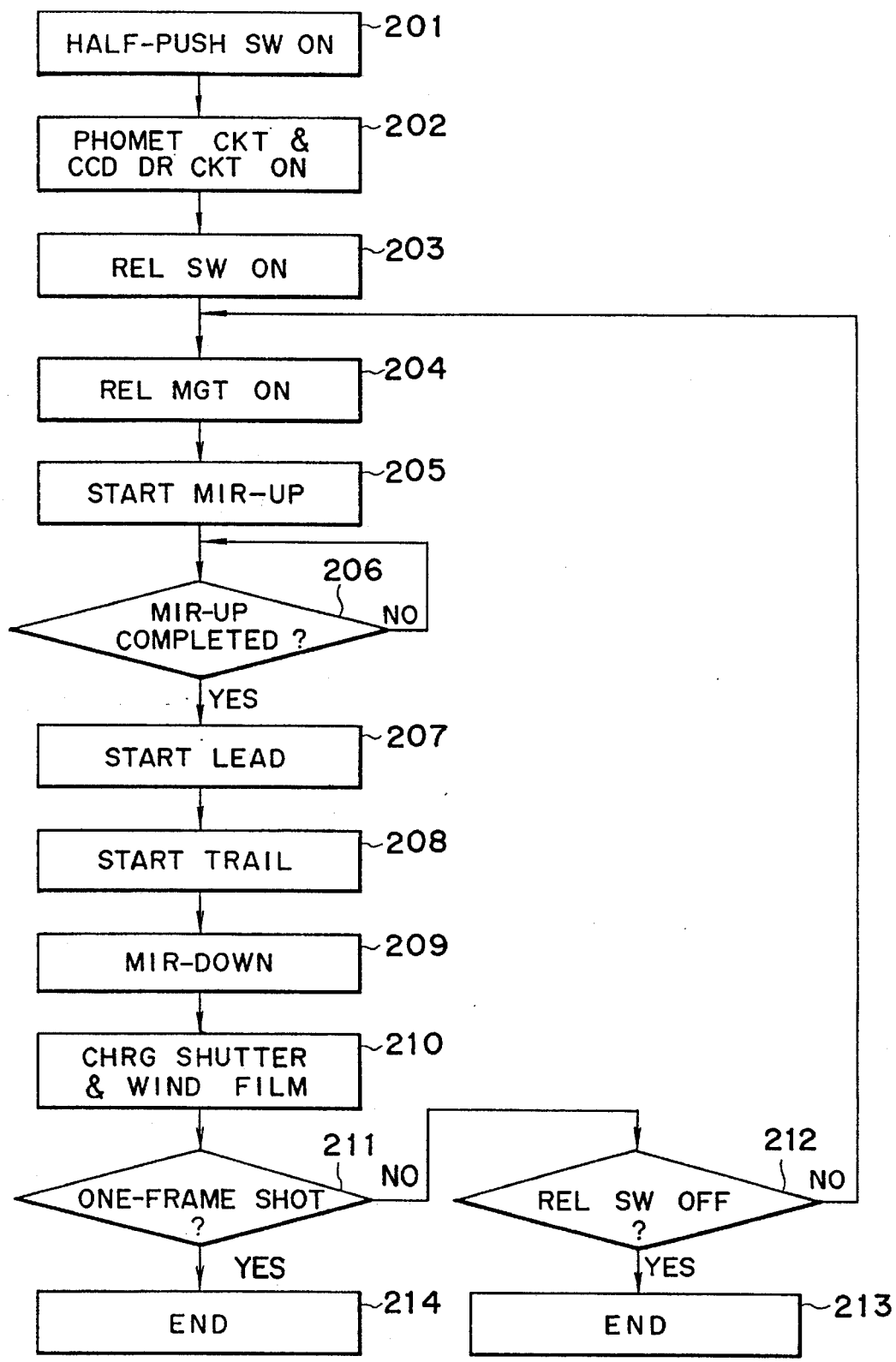
FIG. 6 is a flow chart to show an operation of the camera with the film-back.

A switch S1 is a half-push switch the camera, and a switch S2 a release switch. These switches are operated by pressing down a release button 51 as shown in FIG. 2A. After the half-push switch S1 is turned on, the CPU 101 starts a metering circuit 103. After that, the release switch S2 is turned on. If the film-back 2 is mounted instead of the CCD-back 7, a detection switch S3 will be at a position as shown by a broken line in FIG. 4. In this case, the detection switch contacts 3B, 3C are brought into contact with each other, so that a release signal is input through release switch S2 into the CPU 101. As a consequence, a release magnet 102 is turned on to effect photograph exposure sequence operations of the camera. FIG. 6 as later explained shows a flow chart of the photograph operations.

If the CCD-back is mounted as shown in FIG. 4, the detection switch S3 engages the contacts 3A, 3B because the protruding portion 7A formed on the CCD-back 7 is lower than the protruding portion 2A of the film-back 2. In this connection, the release signal of the release switch S2 is transmitted through the terminals 6B, 9B to a CCD drive circuit 111 as shown in FIG. 4, and a CCD 112 in the CCD package 8 then starts a preparation operation for photo-acceptance to eliminate charge stored therein. After that, the above-mentioned photograph exposure sequence operations are carried out, an image signal is output from the CCD 112, the signal is processed by a signal processing circuit 113, and the processed signal is recorded in a recording device 114, for example, in an electronic recording devices such as IC card, floppy disk, or the like.

Further, there is a detection switch 32 provided on the camera body 1 to detect mounting of the optical low-pass filter 22.

The camera body 1 receives the image plane size signal, which presents an area to be photographed by the selected CCD, through the terminals 6C–9C from the CPU 110 of the CCD-back 7. In response to this image plane size signal, an indicator drive circuit 105 causes an emissive display element 106A or 106B on a finder field indicator 106 to emit light to indicate the image plane size in the finder. The finder field indicator 106 may be provided as a focusing screen 28 or a condenser lens 29, as shown in FIG. 1, having the emissive display element 106A, 106B, for example, like electroluminescence, or as an indication panel right before an eye piece 31.

In case that an electronic flash unit 107 is built in or externally attached to the camera body 1, the CPU 101 controls the illuminating angle of the electronic flash unit 107 in response to the image plane size signal such that the illuminating angle is reduced as the image plane size becomes smaller.

Also, proper photometry may be achieved by switching a photometric area of the metering circuit 103 from one for film to another for a selected CCD size, based on the image plane size signal of the CCD. Next explained with reference to FIG. 5 is a modification of the circuit as shown in FIG. 4. The circuit of FIG. 5 is different from that of FIG. 4 in that the contact 3A of the switch S3 is also connected to the CPU 101. The other structure is identical. When the release switch S2 is turned on, the release signal is simultaneously transmitted both to the CPU 101 in the camera body 1 and to the CPU 110 in the CCD-back 7. As a consequence, the release magnet 102 is turned on to effect the mirror-up operation of the movable mirror 26 and the CCD 112 also starts the photo-acceptance operation to eliminate charge stored therein.

OPERATIONS

Operations of the above-described single-lens reflex cameras will be explained with reference to FIGS. 6–8.

First explained with FIG. 6 is an operation of the camera body 1 with the film-back 2 being mounted thereon.

In FIG. 6, when the release magnet 102 is turned on at Step 204, the mirror-up operation of the movable mirror 26 is started at Step 205. After completion of the mirror-up at Step 206, effected for film exposure are leading curtain run at Step 207 and trailing curtain run at Step 208 of the shutter 21. After photographing, mirror-down operation is performed at Step 209, the shutter 22 is charged for the next photograph, and the film is wound up at Step 210. If a film feed mode is in a one-frame shot mode, as determined in Step 211, the operation ends at Step 214. If the film feed mode is in a continuous photographing mode and the release switch S2 is still on, as determined in Step 212, Step 204 is performed again. Otherwise, the photographing operation is concluded at Step 213.

Figure 7:
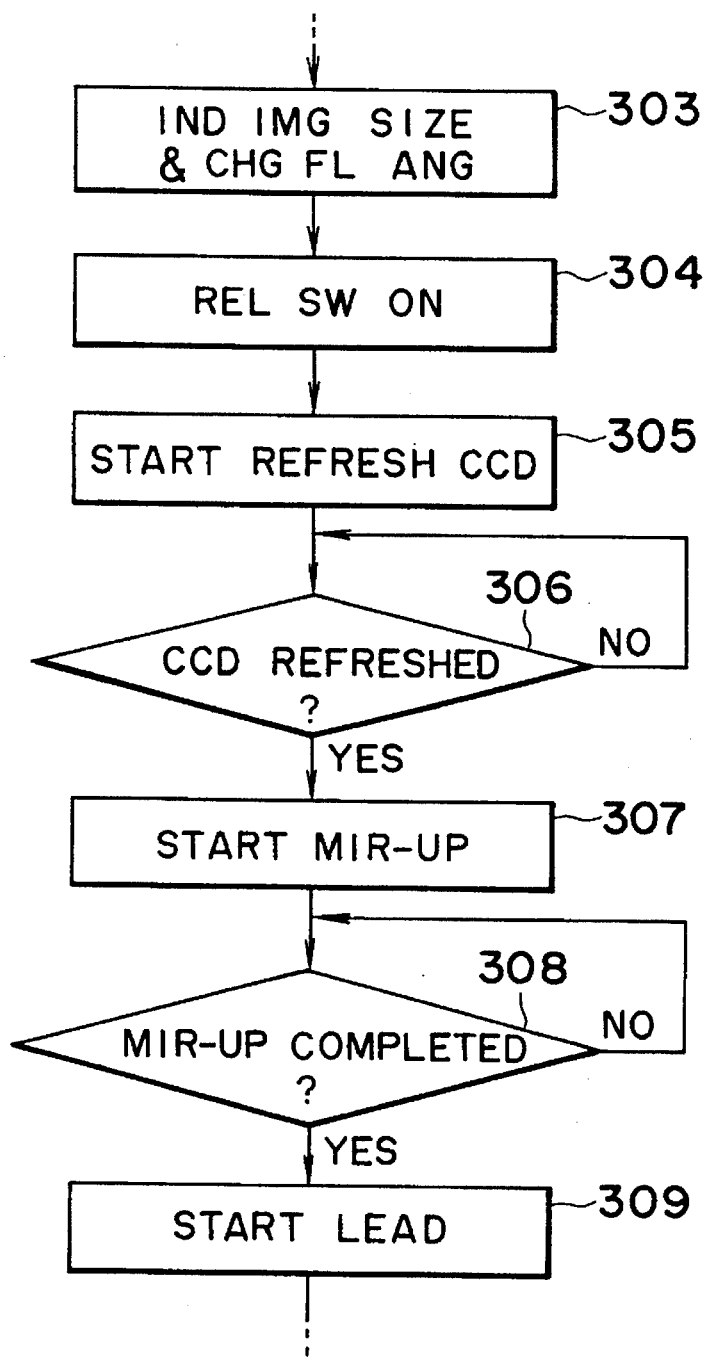
FIG. 7 is a flow chart to show an operation of the camera with the CCD-back.
Figure 8:
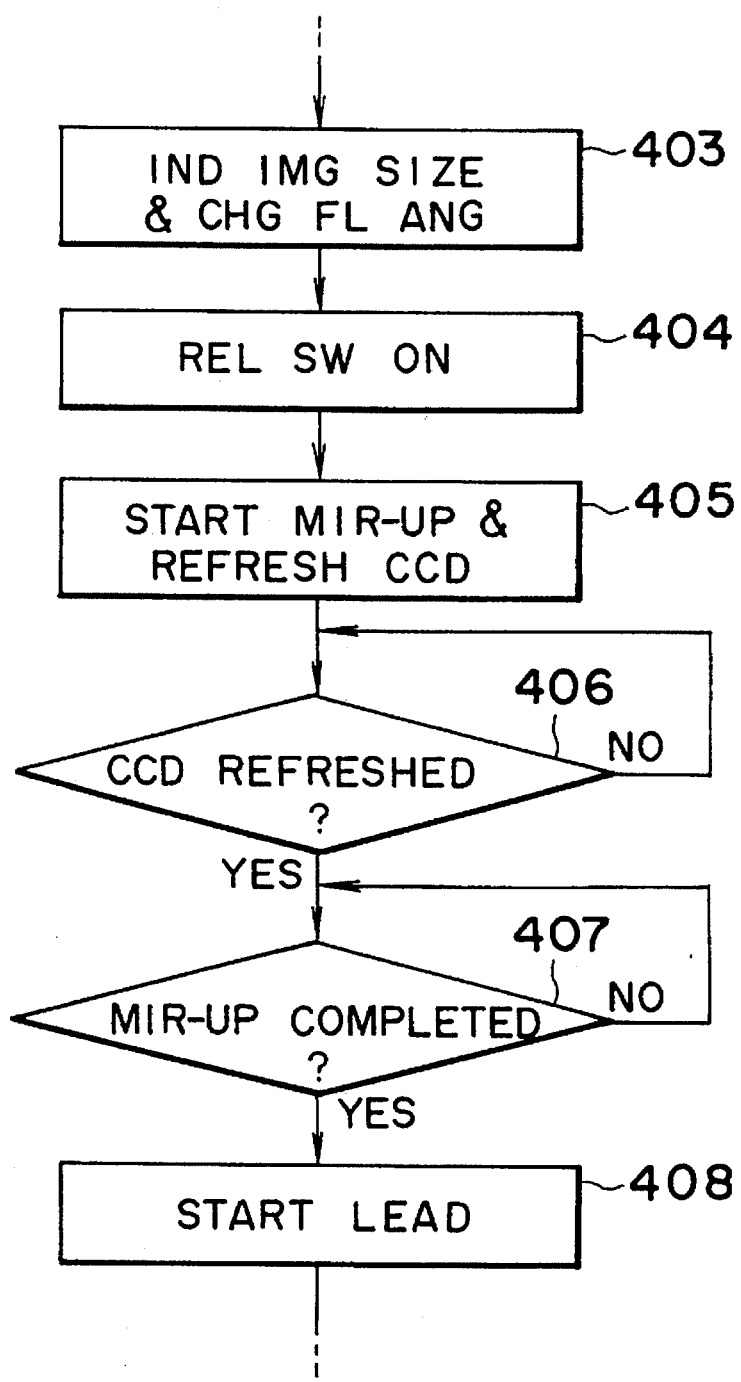
FIG. 8 is a flow chart to show an operation of the camera with the CCD-back as shown in FIG. 5.

Second explained with reference to FIGS. 7 and 8 is an operation of the camera body 1 with the CCD-back 7 being mounted thereon.

When the half-push switch S1 is turned on at Step 201 and the metering circuit 103 is started at Step 202 as shown in FIG. 6, the emissive display element 106A or 106B of the finder field indicator 106 is simultaneously made to emit light to indicate the image plane size in the finder at Step 303 in FIG. 7. Further, if the electronic flash unit 107 is built in or attached to the camera body 1, the illuminating angle will be changed at Step 303.

After that, when the release switch S2 is turned on, release is effected at Step 304. Then a refreshing operation is started at Step 305 to eliminate residual electric charge in the CCD 112 in the CCD package 8.

When the CCD-back 7 is mounted on the camera body 1 as shown in FIG. 3A and 3B, the detection switch S3 in FIG. 4 changes the connection from between the contacts 3B, 3C to between the contacts 3A, 3B. In this state, the release signal of the release switch S2 is transmitted through the terminals 6B, 9B to the CCD drive circuit 111 as shown in FIG. 4, whereby the CCD sweeps out the stored electric charge therein in the CCD package 8.

After completion of CCD refreshment at Step 306 in FIG. 7, a release allowance signal is transmitted from the CCD drive circuit 111 in FIG. 4 through the terminals 9C, 6C to the CPU 101. The release magnet 102 is then turned on, to effect the mirror-up operation of the movable mirror 26 at Step 307, and the mirror-up is completed at Step 308. After the leading curtain run at Step 309, the steps after the trailing curtain run at Step 208 in FIG. 6 will be carried out.

FIG. 8 is a flow chart of the circuit as shown in FIG. 5. When the half-push switch S1 is turned on at Step 201 and then the metering circuit 103 is started at Step 202 in FIG. 6, at Step 403 in FIG. 8 the, emissive display element 106A or 106B of the finder field indicator 106 is simultaneously made to emit light to indicate an image plane size in the finder. Also, if the electronic flash unit 107 is built in or attached to the camera body 1, the illuminating angle is adjusted at Step 403. When the release switch is turned on at Step 404, the release signal is transmitted to the CPU 101 and to the CPU 110. As a consequence, the mirror-up operation and refreshing operation of CCD are simultaneously started at Step 405. The CPU 101 starts the leading curtain run at Step 408 if completion of the CCD refreshment and completion of the mirror-up are both detected at Step 406 and at Step 407, respectively.

MOUNTING OF OPTICAL LOW-PASS FILTER

Mounting of the optical low-pass filter is explained below with reference to FIGS. 9–11.

Figure 10:
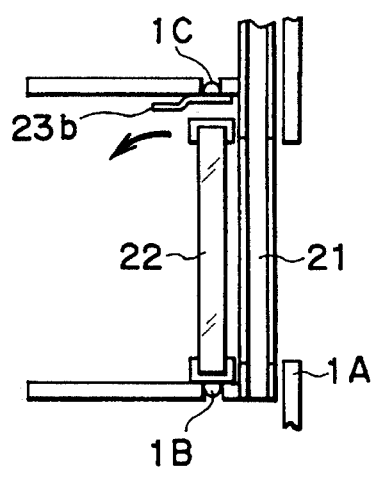
FIG. 10 is a sectional view of the optical low-pass filter in the camera.

In FIG. 10 which is a sectional view of the camera body 1 with the CCD back 7 being mounted thereon, the optical low-pass filter 22 is displaced before and near the focal-plane shutter 21 to cut off high frequency components in space frequencies of luminous flux incident on the CCD package 8 having the built-in CCD chip.

Figure 9:
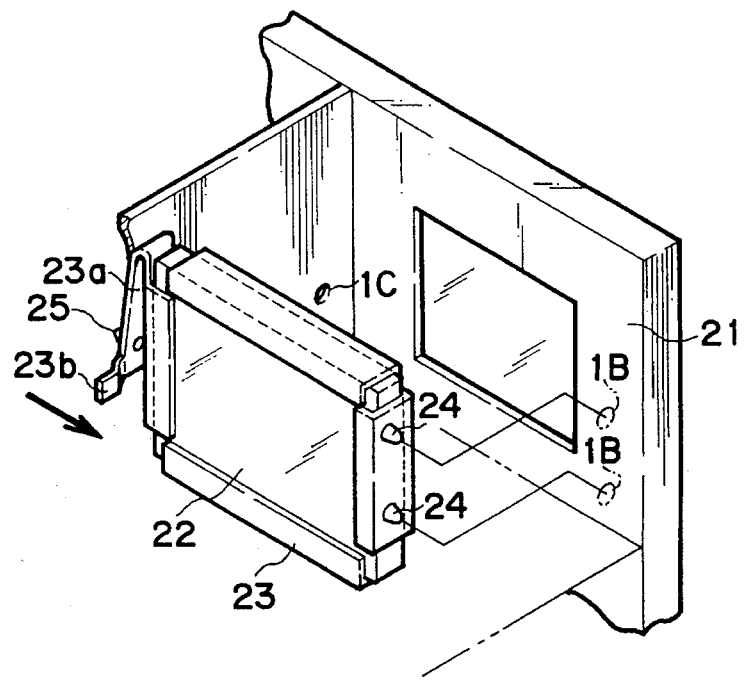
FIG. 9 is a drawing to show an optical low-pass filter in a camera according to the present invention.

FIG. 9 shows a structure of the optical low-pass filter 22 and a procedure of mounting thereof into the mirror box. FIG. 10 is a drawing seen from above FIG. 9 to show a state of the optical low-pass filter 22 being mounted in the mirror box.

The optical low-pass filter 22 is fit in a filter frame 23. When the optical low-pass filter 22 is mounted in the mirror box, the movable mirror 26 is brought up and the filter 22 is inserted into the mirror box. The filter is then set such that pins 24, 25 are fit into positioning pores 1B, 1C provided on the right and left walls in the mirror box. As shown in FIG. 9, the pin 25 is provided on an elastic arm 23a formed as a part of the filter frame 23, which assures secure fitting in the pores 1B, 1C, preventing the filter from dropping out upon receiving vibrations.

The optical low-pass filter 22 may be removed from the camera by drawing a finger grip 23b, provided at the free end of the elastic arm 23a of the filter frame, in the direction of an arrow as shown in FIG. 9. The pin 25 is first taken out of the pore 1C, and the filter frame 23 is deviated in the direction of an arrow as shown in FIG. 10 to take the pins 24 out of the pores 1B, whereby the optical low-pass filter may be removed from the mirror box.

Figure 11:
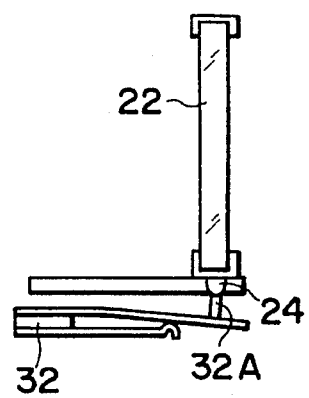
FIG. 11 is another sectional view of the optical low-pass filter in the camera.

There is a switch 32 provided as shown in FIG. 11 in order to prevent one from forgetting removal of the optical low-pass filter 22 upon change of the CCD-back 7 into the film-back 2 or forgetting mounting of the optical low-pass filter 22 upon change of the film-back 2 into the CCD-back 7. A contact lead of switch 32 is provided with a pin 32a to fit the positioning pore 1B.

When the optical low-pass filter 22 is mounted, the pin 24 enters the positioning pore 1B to push the pin 32A of the switch 32, whereby the switch 32 is turned on. If the CCD-back 7 is mounted on the camera body as well, the contacts 3A, 3B are connected with each other in the detection switch S3 as shown in FIG. 4. Consequently, the CPU 101 of the camera body 1 detects signals of mounting of the CCD-back 7 through the contacts 3A, 3B and of mounting of the optical low-pass filter 22 through the switch 32, whereby the CPU 101 controls shutter release to be accepted. However, if the CPU 101 fails to detect either the signal of mounting of the CCD-back 7 or the signal of mounting of the optical low-pass filter 22, the CPU inhibits the exposure sequence operations or effects shutter release locking to lock the shutter release even when the release switch S2 is turned on. Furthermore, if a warning is displayed by LED or the like in the finder, or, if a warning sound is generated, a photographer may readily recognize the warning to understand the condition of the camera, which would be convenient for the photographer.

A TTL (through-the-lens) automatic metering control for the electronic flash unit 107, which controls illumination amount using reflection from a film plane, cannot be used upon mounting of the optical low-pass filter because the reflectance of the CCD is different from that of the film plane. However, if an external automatic metering control or manual illumination control is employed for the electronic flash unit 107 upon mounting of the optical low-pass filter, there would be no problem caused by the mounting of the optical low-pass filter. For this purpose, the CPU 101 of the camera 1 detects an illumination control mode employed by the electronic flash unit 107 built in or attached to the camera, either the TTL automatic metering mode or other metering mode, and also detects the signal of the switch 32. When the CPU 101 detects the selection of the TTL automatic metering control mode and mounting of the optical low-pass filter, it conducts the shutter release lock and/or warning display as explained above.

A color filter may be used in the mirror box instead of the optical low-pass filter, expecting specific effects upon photographing.

Also, the single optical low-pass filter is not essential, but the optical low-pass filter may be combined with an Infra-Red cut filter for adjustment between spectral sensitivity of the CCD and spectral luminous efficacy.

As detailed above, according to the present invention, the adaptor for electronic still photography is provided with the image pick-up means disposed near the film plane, and the optical low-pass filter is arranged in the camera body, whereby the camera with the adaptor may be made compact.

Further, upon photographing with the electronic still photographic adaptor instead of the ordinary back panel, if the optical low-pass filter is not mounted in the camera, the recorded image signal would be inferior and moire would occur by the recorded image signal. According to the present invention, such problems have been solved by providing the detecting devices for detection of adaptor mounting and for detection of filter mounting. On the contrary, upon photographing on a film with the ordinary back panel, if the optical low-pass filter remains mounted, the focal surface may fail to coincide with the film position, presenting an image out of focus. The arrangement as described above according to the present invention may avoid such problems.

Furthermore, upon mounting of the CCD-back on the camera instead of the film-back, the optical low-pass filter may be readily mounted in a space between the shutter and the movable mirror.

Also the arrangement of the present invention as described starts the photograph exposure sequence when both the operations of CCD refreshment and mirror-up of the movable mirror have been completed, providing the image signal of good image quality without influence of residual electric charge in the image pick-up element.

Since the size of image pick-up element or image plane size to be photographed is detected, the possible photographic area is automatically displayed in the finder field, and the illuminating angle of the electronic flash unit may be automatically adjusted.

Also, detection of the optical low-pass filter and detection of the illumination control mode of the electronic flash unit are carried out in the arrangement of the present invention. Therefore, when selection of the TTL automatic metering control mode and mounting of the optical low-pass filter are detected, shutter release lock may be effected or a warning may be displayed to prevent inappropriate photographing.

What is claimed is:

1. A single-lens reflex camera having: a mirror movable between an non-photographic position where light from a subject is transmitted to a finder optical system and a photographic position where the light is transmitted to a film plane; a focal-plane shutter normally closed to prevent the light from reaching the film plane, and moved to open so as to allow the light to reach the film plane; a removable, ordinary photograph back panel; said camera being provided for electronic still photography with an electronic still photographic adaptor substituted for said back panel and having image pick-up means located near the film plane when set thereon, and with an optical low-pass filter mountable between said focal-plane shutter and said mirror to cut off a high frequency component in space frequencies of light; further comprising, first detection means for detecting mounting of said electronic still photographic adaptor;

second detection means for detecting mounting of said optical low-pass filter; and control means for inhibiting opening of said focal-plane shutter when either of said first and second detection means detects no mounting, but for allowing opening of the shutter when both detection means detect the respective mountings.

2. A single-lens reflex camera according to claim 1, wherein said image pick-up means is a charge storage photo-receiving element, and said control means detects completion of photo-receiving preparation with elimination of residual charge in the charge storage photo-receiving element, and completion of movement of said mirror to said photographic position, before allowing opening of said focal-plane shutter.

3. A single-lens reflex camera according to claim 1, wherein said image pick-up means is a charge storage photo-receiving element, and said control means detects completion of photo-receiving preparation with elimination of residual charge in the charge storage photo-receiving element before allowing opening of said focal-plane shutter.

4. A single-lens reflex camera according to claim 1, wherein each of said electronic still photographic adaptor and said ordinary photograph back panel is provided with a protrusion at a corresponding position thereon, one of said protrusions being different in height from the other, said protrusions being fitted in a recess provided on said camera, and said first detection means detects the mounting of said adaptor based on height of a protrusion fit in said recess.

5. An adaptor for electronic still photography detachably mountable onto the single-lens reflex camera as defined in claim 4.

6. A single-lens reflex camera according to claim 1, wherein said optical low-pass filter has a projection for mounting to the camera, said projection fitting in a recess provided on the camera upon mounting, and said second detection means detects the mounting of said optical low-pass filter based on the fitting of the projection into the recess.

7. An optical low-pass filter detachably mountable onto the single-lens reflex camera as defined in claim 6.

8. A single-lens reflex camera having: a mirror movable between a non-photographic position where light from a subject is transmitted to a finder optical system and a photographic position where the light is transmitted to a film plane; a focal-plane shutter normally closed to prevent the light from reaching the film plane and moved to open so as to allow the light to reach the film plane; a removable, ordinary photograph back panel; said camera being provided for electronic still photography with an electronic still photographic adaptor substituted for said back panel and having image pick-up means located near the film plane when set thereon, and with an optical low pass filter mountable between said focal plane shutter and said mirror to cut off a high frequency component in space frequencies of light; further comprising, first detection means for detecting mounting of said electronic still photographic adaptor;

second detection means for detecting mounting of said optical low-pass filter; and control means for generating a warning when either of said first and second detection means detects no mounting.

9. A single-lens reflex camera having: a mirror movable between a non-photographic position where light from a subject is transmitted to a finder optical system and a photographic position where the light is transmitted to a film plane; a focal-plane shutter normally closed to prevent the light from reaching the film plane, and moved to open so as to allow the light to reach the film plane; a removable, ordinary photograph back panel; said camera being provided for electronic still photography with an electronic still photographic adaptor substituted for said back panel and having image pick-up means located near the film plane when set thereon, and with an optical low-pass filter mounted between said focal-plane shutter and said mirror to cut off a high frequency component in space frequencies of light said camera being capable of selecting either one of TTL automatic metering control and non-TTL automatic metering control modes, effecting and not effecting TTL automatic metering, respectively, further comprising, filter detection means for detecting the mounting of said optical low-pass filter;

mode detection means for detecting said TTL automatic metering mode; and control means for inhibiting opening of said focal-plane shutter when said filter detection means detects mounting of said optical low-pass filter and when said mode detection means detects said TTL automatic metering control mode.

10. A single lens reflex camera having: a mirror movable between a nonphotographic position where light from a subject is transmitted to a finder optical system and a photographic position where the light is transmitted to a film plane; a focal-plane shutter normally positioned at a closed position to prevent the light from reaching the film plane, and moved to open so as to allow the light to reach the film plane; a removable, ordinary photograph back panel; said camera being provided for electronic still photography with an electronic still photographic adaptor substituted for said back panel and having an image pick-up element located near the film plane when set thereon, and with an optical low-pass filter mounted between said focal-plane shutter and said mirror to cut off a high frequency component in space frequencies of light; further comprising:

a first detecting portion which detects an attachment of said electronic still photographic adaptor;

a second detecting portion which detects an attachment of said optical low-pass filter; and a control portion electrically connected to said first and second detecting portions, which inhibits the opening operation of said focal-plane shutter when either of said first and second detecting portions detects no attachment, but which allows the opening operation of the shutter when both detecting portions detect attachment.

11. A single-lens reflex camera having: a mirror movable between a nonphotographic position where light from a subject is transmitted to a finder optical system and a photographic position where the light is transmitted to a film plane; a focal plane shutter normally positioned at a closed position to prevent the light from reaching the film plane, and moved to open so as to allow the light to reach the film plane; a removable, ordinary photograph back panel; said camera being provided for electronic still photographing with an electronic still photographic adaptor substituted for said back panel and having an image pick-up element located near the film plane when set thereon, and with an optical low-pass filter mounted between said focal-plane shutter and said mirror to cut off a high frequency component in space frequencies of light; further comprising:

a first detecting portion which detects an attachment of said electronic still photographic adaptor;

a second detecting portion which detects an attachment of said optical low-pass filter; and a control portion electrically connected to said first and second detecting portions, which generates an alarm when either of said first and second detecting portions detects no attachment.

12. A camera to which an ordinary photograph back panel, an electronic still photographic adaptor or an optical low-pass filter to cut-off a high frequency component in space frequencies of light is attachable, said camera achieving an ordinary photographing when the ordinary photograph back panel is attached thereto, said camera achieving an electronic still photographing when the electronic still photographic adaptor and the optical low-pass filter are attached thereto, comprising:

a first detecting portion which detects an attachment of said electric still photographic adaptor;

a second detecting portion which detects an attachment of said optical low-pass filter; and a control portion electrically connected to said first and second detecting portions;

wherein said control portion inhibits a photographing when either one of said first and second detecting portions does not detect the attachment.

13. A camera to which an ordinary photograph back panel, an electronic still photographic adaptor or an optical low-pass filter to cut-off a high frequency component in space frequencies of light is attachable, said camera achieving an ordinary photographing when the ordinary photograph back panel is attached thereto, said camera achieving an electronic still photographing when the electronic still photographic adaptor and the optical low-pass filter are attached thereto, comprising:

a first detecting portion which detects an attachment of said electronic still photographic adaptor;

a second detecting portion which detects an attachment of said optical low-pass filter;

an indicator; and a control portion electrically connected to said first and second detecting portions and said indicator;

wherein said control portion drives said indicator when either one of said first and second detecting portions does not detect the attachment.

* * * * *